United States Patent
Hayashi et al.

(10) Patent No.: US 12,120,274 B2
(45) Date of Patent: Oct. 15, 2024

(54) IMAGE FORMATION WITH INCREASED PRODUCTIVITY BY DETERMINING SURFACE STATE OF MEDIUM CONVEYING ROLLER BASED ON DETECTED FLUCTUATION RANGE IN ROLLER DRIVING LOAD

(71) Applicant: Konica Minolta, Inc., Tokyo (JP)

(72) Inventors: Akihiro Hayashi, Okazaki (JP); Yuji Kobayashi, Toyohashi (JP); Hiroshi Eguchi, Toyohashi (JP); Takeshi Tamada, Toyohashi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/226,296

(22) Filed: Jul. 26, 2023

(65) Prior Publication Data
US 2024/0056532 A1  Feb. 15, 2024

(30) Foreign Application Priority Data
Aug. 15, 2022  (JP) .................. 2022-129206

(51) Int. Cl.
*H04N 1/00*  (2006.01)

(52) U.S. Cl.
CPC ..... *H04N 1/00037* (2013.01); *H04N 1/00015* (2013.01); *H04N 1/00074* (2013.01); *H04N 1/00602* (2013.01); *H04N 1/00909* (2013.01)

(58) Field of Classification Search
CPC .......... H04N 1/00015; H04N 1/00029–00039; H04N 1/0005; H04N 1/00053; H04N 1/00055; H04N 1/00063; H04N 1/00068; H04N 1/00074; H04N 1/00082; H04N 1/00572; H04N 1/00588; H04N 1/00602; H04N 1/0062; H04N 1/00625; H04N 1/00663; H04N 1/00909; H04N 1/00954; H04N 1/2323; H04N 1/2392; G06K 15/4025; G06K 15/4065; B65H 5/06; B41J 11/0035; B41J 13/0009; B41J 13/0018; B41J 13/0027; B41J 13/02; B41J 13/03
See application file for complete search history.

(56) References Cited

U.S. PATENT DOCUMENTS

| | | | | |
|---|---|---|---|---|
| 7,438,288 B2 * | 10/2008 | Nishiberi | ............ | B41J 13/02 271/272 |
| 7,522,872 B2 * | 4/2009 | Fukuta | ............ | G03G 15/6558 399/388 |
| 8,801,137 B2 * | 8/2014 | Yoshida | ............ | B41J 15/04 347/105 |
| 8,899,581 B2 * | 12/2014 | Yamaguchi | ........ | H04N 1/00652 271/270 |

(Continued)

FOREIGN PATENT DOCUMENTS

| | | | |
|---|---|---|---|
| JP | 08310676 A | * | 11/1996 |
| JP | 2000-238934 A | | 9/2000 |

(Continued)

*Primary Examiner* — Scott A Rogers
(74) *Attorney, Agent, or Firm* — RANKIN, HILL & CLARK LLP

(57) ABSTRACT

An image forming apparatus includes: a drive source that drives an object; and a hardware processor that detects a fluctuation range of a load applied to the drive source by driving the object, and determines a state of the object on a basis of a detection result.

24 Claims, 10 Drawing Sheets

(56) References Cited

U.S. PATENT DOCUMENTS

| | | | |
|---|---|---|---|
| 9,446,922 B2 * | 9/2016 | Samoto | B65H 7/06 |
| 9,857,750 B1 * | 1/2018 | Moriya | B65H 9/00 |
| 10,162,296 B2 * | 12/2018 | Moriya | G03G 15/703 |
| 11,247,861 B2 * | 2/2022 | Arai | B65H 7/02 |
| 11,269,277 B1 * | 3/2022 | Taki | G03G 15/5008 |
| 11,834,286 B2 * | 12/2023 | Tokuno | B65H 7/04 |
| 2020/0290832 A1 * | 9/2020 | Shiozawa | B65H 7/08 |

FOREIGN PATENT DOCUMENTS

| | | | |
|---|---|---|---|
| JP | 2006062852 A | * | 3/2006 |
| JP | 2014038241 A | * | 2/2014 |
| JP | 2018-54645 A | | 4/2018 |

* cited by examiner

| TRAY | TYPE OF PRINT MEDIUM | SIZE OF PRINT MEDIUM |
|---|---|---|
| FIRST TRAY | PLAIN PAPER | A4 |
| SECOND TRAY | RECYCLED PAPER | A3 |
| THIRD TRAY | COATED PAPER | A3 |

| SHEET FEED ROLLER | TRAVEL DISTANCE FROM PREVIOUS CLEANING | TOTAL TRAVEL DISTANCE | REPLACEMENT-SPECIFIED TRAVEL DISTANCE |
|---|---|---|---|
| FIRST TRAY | 142 | 2451 | 10000 |
| SECOND TRAY | 186 | 1864 | 10000 |
| THIRD TRAY | 96 | 578 | 10000 |

| TRAY | THRESHOLD |
|---|---|
| FIRST TRAY | $Vth1$ |
| SECOND TRAY | $Vth2$ |
| THIRD TRAY | $Vth3$ |

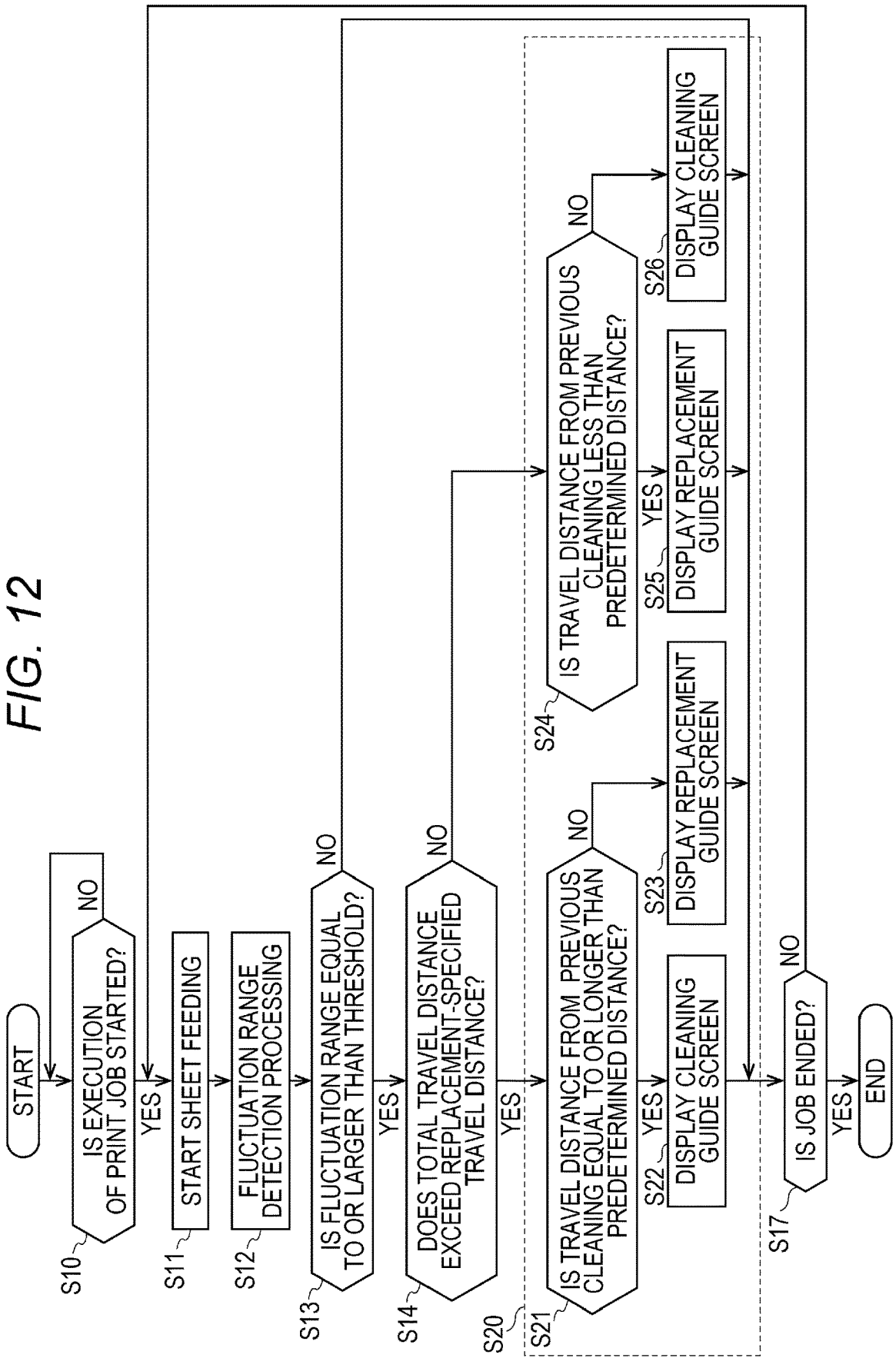

IMAGE FORMATION WITH INCREASED PRODUCTIVITY BY DETERMINING SURFACE STATE OF MEDIUM CONVEYING ROLLER BASED ON DETECTED FLUCTUATION RANGE IN ROLLER DRIVING LOAD

The entire disclosure of Japanese patent Application No. 2022-129206, filed on Aug. 15, 2022, is incorporated herein by reference in its entirety.

BACKGROUND

Technological Field

The present invention relates to an image forming apparatus, a detection method, and a program.

Description of the Related Art

An image forming apparatus such as a multifunction peripheral (MFP) or a printer includes various objects driven by a drive source inside the apparatus. For example, a roller that conveys a print medium such as a print sheet is an object that is rotationally driven by a motor.

Conventionally, in this type of image forming apparatus, a technique of detecting that one end of a print medium has passed through a roller by detecting fluctuations in load applied to a motor has been proposed (for example, JP 2000-238934 A). In this conventional technique, the timing when the rear end of the print medium passes through a sheet feed roller is detected. Specifically, the average value of a current waveform flowing through a motor as a drive source is calculated, and in a case where the average value becomes smaller than a predetermined threshold, it is detected that the rear end of the print medium has passed through the sheet feed roller.

In addition, in order to determine whether or not to perform the cleaning mode of an intermediate transfer belt, it has been proposed to obtain the average value of the duty ratio of a PWM signal when the motor is driven (for example, JP 2018-54645 A). In this conventional technique, the average value in a state where a developing sleeve is driven and the average value in a state where the developing sleeve is stopped are calculated, and when the average value in the state where the developing sleeve is stopped becomes 60% or less of the average value in the state where the developing sleeve is driven, the cleaning mode of the intermediate transfer belt is performed.

Meanwhile, paper dust is likely to adhere to a roller that conveys a print medium such as a print sheet. For example, if paper dust adheres to a sheet feed roller, the sheet feed roller is likely to slide during the rotation of the sheet feed roller, and sheet misfeeding is likely to occur. If sheet misfeeding of the sheet feed roller occurs, a jam occurs. As a result, a print job has to be stopped, and productivity of an image forming apparatus is reduced.

In order to reduce sheet misfeeding of the sheet feed roller, it is conceivable to periodically clean the sheet feed roller to remove paper dust. However, in a case where the sheet feed roller is periodically cleaned, cleaning is performed although paper dust does not adhere so much, and the image forming apparatus cannot be used due to cleaning.

In addition, since the cleaning wears the surface of the sheet feed roller, if the number of times of cleaning increases, the life of the sheet feed roller is shortened, and the frequency of replacement of the sheet feed roller increases. As a result, the image forming apparatus cannot be used due to the replacement of the sheet feed roller.

That is, if the frequency of cleaning or replacement of the sheet feed roller increases, the time during which the image forming apparatus cannot be used normally increases, and there is a problem that productivity of the image forming apparatus decreases.

In order to suppress a decrease in the productivity of the image forming apparatus, it is desirable to appropriately detect the amount of paper dust adhering to the sheet feed roller and prevent unnecessary cleaning and replacement. However, the amount of paper dust adhering to the surface of the sheet feed roller cannot be appropriately detected by the method of obtaining the average value of the current flowing through the motor as the drive source or the average value of the duty ratio of the PWM signal as in the conventional technique. Therefore, it has conventionally been difficult to appropriately perform cleaning, replacement, and the like depending on the actual state of the surface of the sheet feed roller.

Note that the problem described above is not limited to the sheet feed roller, and similarly occurs in various objects driven by a drive source such as a motor.

SUMMARY

Therefore, the present invention has been made to solve the conventional problems described above, and an object thereof is to provide an image forming apparatus, a detection method, and a program capable of appropriately detecting the state of an object driven by a drive source.

To achieve the abovementioned object, according to an aspect of the present invention, an image forming apparatus reflecting one aspect of the present invention comprises: a drive source that drives an object; and a hardware processor that detects a fluctuation range of a load applied to the drive source by driving the object, and determines a state of the object on a basis of a detection result.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 4 is a diagram illustrating an example of print medium information;

FIG. 5 is a diagram illustrating an example of roller information;

FIG. 6 is a diagram illustrating an example of threshold information;

FIG. 12 is a flowchart illustrating an example of another processing procedure performed in the image forming apparatus.

DETAILED DESCRIPTION OF EMBODIMENTS

Figure 1:
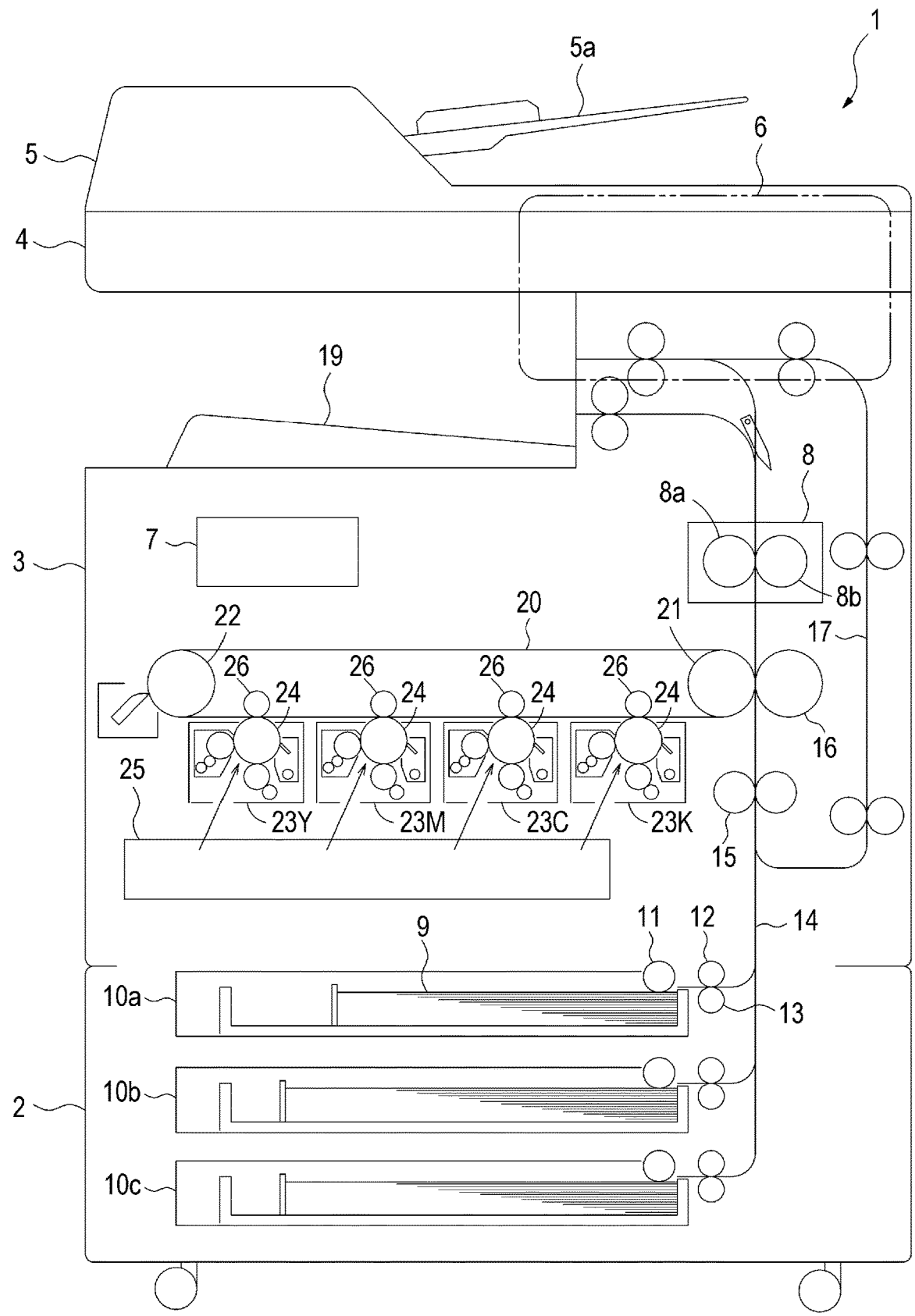
FIG. 1 is a diagram illustrating an internal configuration example of an image forming apparatus.

Hereinafter, one or more embodiments of the present invention will be described with reference to the drawings. However, the scope of the invention is not limited to the disclosed embodiments. Note that, in the embodiments described below, common elements are denoted by the same reference numerals, and redundant description thereof will be omitted.

(Configuration of Image Forming Apparatus)

FIG. 1 is a diagram illustrating an internal configuration example of an image forming apparatus 1 according to an embodiment of the present invention. The image forming apparatus 1 is an MFP in which a plurality of functions such as a copy function, a print function, a facsimile function, and an image reader function are integrated. The image forming apparatus 1 includes a sheet feeder 2 and an image forming unit 3 in a lower part of an apparatus body, and includes a scanner 4 and an automatic document feeder (ADF) 5 in an upper part of the apparatus body. In addition, the image forming apparatus 1 includes an operation panel 6 that can be operated by a user on the front side of the apparatus body. Furthermore, the image forming apparatus 1 includes a controller 7 that controls the operation of each unit inside the apparatus body.

The scanner 4 and the automatic document feeder 5 in the upper part of the apparatus body are parts that operate at the time of document reading by the copy function, the facsimile function, and the image reader function, and automatically read an image of a document set by the user and generate image data. The automatic document feeder 5 includes a document tray 5a on which documents are placed, and in a case where a plurality of documents are set on the document tray 5a, the uppermost document is taken out one by one from the plurality of documents and automatically conveyed toward an image reading position in the scanner 4. The scanner 4 performs image reading in conjunction with a document conveying operation of the automatic document feeder 5, and automatically reads an image of a document automatically conveyed by the automatic document feeder 5 to generate image data. Note that a plurality of rollers (not illustrated) are provided inside the automatic document feeder 5, and the plurality of rollers are rotationally driven by a drive source such as a motor to automatically convey a document.

The sheet feeder 2 and the image forming unit 3 in the lower part of the apparatus body are parts that operate at the time of image formation by the copy function, the print function, and the facsimile function, and convey a sheet-like print medium 9 such as a print sheet to form an image based on image data to be printed on the print medium 9.

The sheet feeder 2 includes a plurality of sheet feed trays 10a, 10b, and 10c, and the print medium 9 is stored in each of the sheet feed trays 10a, 10b, and 10c. In some cases, print media 9 of different types or different sizes are stored in the sheet feed trays 10a, 10b, and 10c. The sheet feeder 2 includes a pickup roller 11, a sheet feed roller 12, and a separation roller 13 in order to supply the print medium 9 stored in each of the sheet feed trays 10a, 10b, and 10c toward a conveyance path 14 on a downstream side one by one. For example, when feeding the print medium 9 stored in the sheet feed tray 10a, the sheet feeder 2 rotationally drives the pickup roller 11 and the sheet feed roller 12 provided in the sheet feed tray 10a. As a result, the uppermost print medium 9 among the plurality of print media 9 stored in the sheet feed tray 10a is supplied to the conveyance path 14 on the downstream side.

The conveyance path 14 includes a registration roller 15, a secondary transfer roller 16, and a fixing unit 8. The registration roller 15 is a roller that performs skew correction of the print medium 9 fed from the sheet feeder 2 and sends the print medium 9 to the secondary transfer roller 16 at a predetermined timing. The secondary transfer roller 16 secondarily transfers a toner image primarily transferred to an intermediate transfer belt 20 in the image forming unit 3 to one surface of the print medium 9, thereby forming an image on the one surface of the print medium 9. The print medium 9 to which the toner image has been secondarily transferred by the secondary transfer roller 16 passes through the fixing unit 8, so that the toner image is fixed on the one surface of the print medium 9. The fixing unit 8 includes, for example, a heat roller 8a and a pressure roller 8b, and fixes the toner image to the print medium 9 by sandwiching the print medium 9 between the heat roller 8a and the pressure roller 8b and performing a heat treatment and a pressure treatment on the print medium.

Furthermore, the conveyance path 14 includes a reverse path 17 that reverses the print medium 9 in order to form an image on the back surface of the print medium 9. For example, in a case where double-sided printing is designated in a print job, the sheet feeder 2 guides the print medium 9 having an image formed on one surface and having passed through the fixing unit 8 to the reverse path 17, reverses the print medium 9, and conveys the reversed print medium 9 to the registration roller 15 again.

The image forming unit 3 includes the intermediate transfer belt 20 stretched between a drive roller 21 and a driven roller 22. The intermediate transfer belt 20 is configured as an endless belt, and circulates between the drive roller 21 and the driven roller 22 by the rotation of the drive roller 21. The drive roller 21 is provided at a position facing the secondary transfer roller 16. The intermediate transfer belt 20 circulates while being nipped by the drive roller 21 and the secondary transfer roller 16.

Image forming units 23Y, 23M, 23C, and 23K are arranged under the intermediate transfer belt 20 between the drive roller 21 and the driven roller 22. The image forming units 23Y, 23M, 23C, and 23K are units that primarily transfer toner images of yellow (Y), magenta (M), cyan (C), and black (K) to the surface of the intermediate transfer belt 20, respectively. Each of the image forming units 23Y, 23M, 23C, and 23K includes a photosensitive drum 24 as an image carrier. The photosensitive drum 24 is axially supported so as to rotate in a predetermined direction (a clockwise direction), and a charger, a developing device, and a cleaning member are disposed around the photosensitive drum 24. Furthermore, an exposure device 25 that exposes the photosensitive drums 24 of the image forming units 23Y, 23M, 23C, and 23K is provided below the image forming units 23Y, 23M, 23C, and 23K. The image forming units 23Y, 23M, 23C, and 23K form an electrostatic latent image on the surface of the photosensitive drum 24 by charging the surface of the photosensitive drum 24 to a predetermined charge by the charger and then exposing the surface by the exposure device 25. Thereafter, the developing device applies a developer containing toner to the surface of the photosensitive drum 24, thereby visualizing the electrostatic latent image with toner. As a result, a toner image is formed on the surface of the photosensitive drum 24.

The photosensitive drum 24 having the toner image formed thereon is joined to the intermediate transfer belt 20. At this joining position, a primary transfer roller 26 is disposed with the intermediate transfer belt 20 interposed between the photosensitive drum and the primary transfer roller, and the toner image formed on the photosensitive drum 24 is primarily transferred to the intermediate transfer belt 20 by a transfer voltage applied to the primary transfer roller 26. The image forming units 23Y, 23M, 23C, and 23K can form a color image on the surface of the intermediate transfer belt 20 by superimposing and primarily transferring the toner images of the individual colors onto the intermediate transfer belt 20. The toner image primarily transferred to the intermediate transfer belt 20 is secondarily transferred to the surface of the print medium 9 supplied by the registration roller 15 when passing through the position of the secondary transfer roller 16.

The print medium 9 on which the image is formed as described above is discharged onto a tray 19 provided on the upper part of the image forming unit 3. Note that the image forming unit 3 can also form a monochrome image on the print medium 9 fed by the sheet feeder 2 by operating only the image forming unit 23K among the plurality of image forming units 23Y, 23M, 23C, and 23K.

(Configuration of Sheet Feed Roller)

Figure 2A:
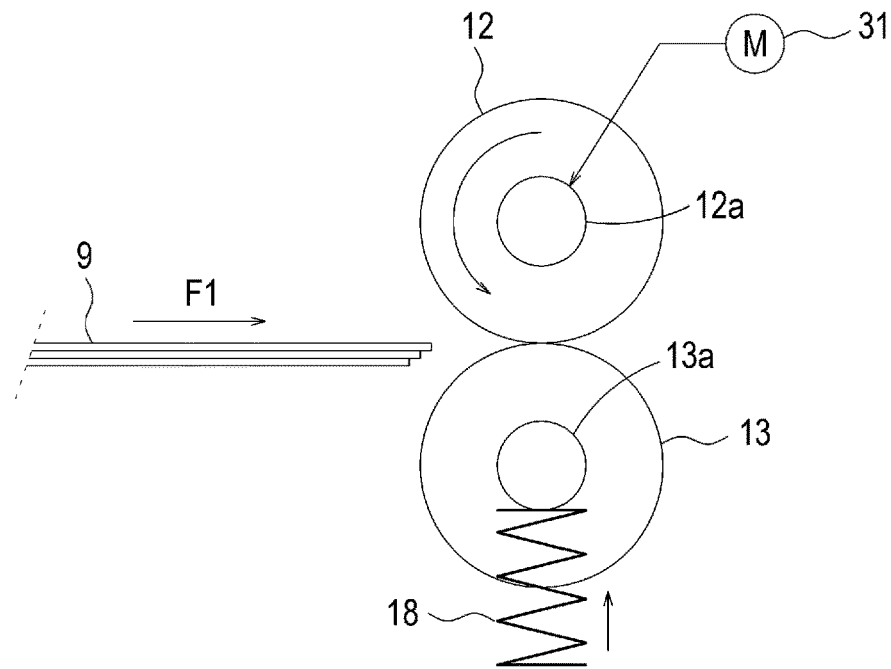
FIGS. 2A and 2B are enlarged views of a sheet feed roller and a separation roller.
Figure 2B:
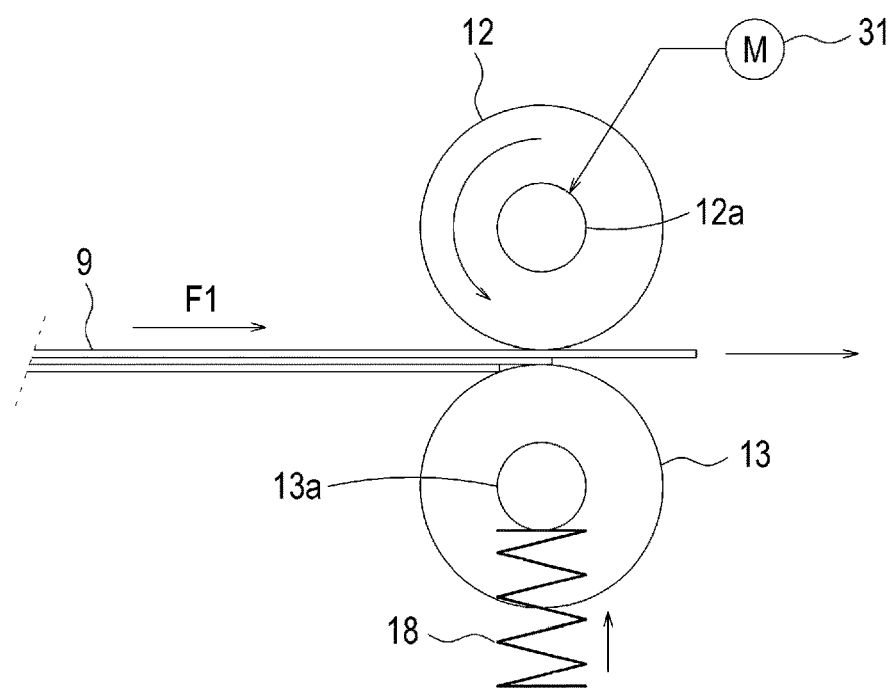

FIGS. 2A and 2B are enlarged views of the sheet feed roller 12 and the separation roller 13. As illustrated in FIG. 2A, the sheet feed roller 12 and the separation roller 13 form a pair with each other, and the outer peripheral surfaces of the rollers are joined with each other to form a nip. The sheet feed roller 12 is a rotating body in which a rotating shaft 12*a* is rotationally driven in a predetermined direction (a counterclockwise direction) by a motor 31 as a drive source. On the other hand, the separation roller 13 is a rotating body that is rotatably supported by a rotating shaft 13*a* and that is driven to rotate with the rotation of the sheet feed roller 12 in a predetermined direction (the clockwise direction). Here, the rotating shaft 13*a* of the separation roller 13 includes a torque limiter, and the separation roller 13 does not rotate unless the torque acting on the separation roller 13 becomes larger than or equal to a predetermined torque. Furthermore, the rotating shaft 13*a* of the separation roller 13 is biased by a biasing member 18 such as a spring so as to be joined to the sheet feed roller 12 with a predetermined pressing force. With the above configuration, the sheet feed roller 12 and the separation roller 13 can convey one print medium 9 sent from the pickup roller 11 to the conveyance path 14 on the downstream side.

For example, in a case one print medium 9 is sent toward the sheet feed roller 12 by the pickup roller 11, the print medium 9 is nipped by the sheet feed roller 12 and the separation roller 13. At this time, the sheet feed roller 12 is in contact with the upper surface of the print medium 9, and the separation roller 13 is in contact with the lower surface of the same print medium 9. As the sheet feed roller 12 rotates in a predetermined direction, the print medium 9 is sent toward the conveyance path 14 on the downstream side of the sheet feed roller 12. A torque larger than or equal to a predetermined torque acts on the separation roller 13 accordingly, and the separation roller 13 is driven to rotate with the movement of the print medium 9.

On the other hand, as illustrated in FIG. 2A, when the plurality of print media 9 are sent in a direction of an arrow F1 toward the sheet feed roller 12 by the pickup roller 11, the plurality of print media 9 are nipped by the sheet feed roller 12 and the separation roller 13. At this time, the sheet feed roller 12 is in contact with the upper surface of the first print medium 9 positioned uppermost among the plurality of print media 9, and the separation roller 13 is in contact with the lower surface side of the second and subsequent print media 9. When the sheet feed roller 12 rotates in a predetermined direction in such a state, only the first print medium 9 is conveyed to the conveyance path 14 on the downstream side in the conveyance direction as illustrated in FIG. 2B. At this time, since the first print medium 9 slides on the upper surface of the second print medium 9 and moves downstream, the second and subsequent print media 9 do not move downstream. In addition, since a torque larger than or equal to a predetermined torque does not act on the separation roller 13, the separation roller 13 does not rotate. With such an action, the sheet feed roller 12 and the separation roller 13 separate the first print medium 9 from the second and subsequent print media 9, supply only the first print medium 9 to the downstream side in the conveyance direction, and restrict the movement of the second and subsequent print media 9 to the downstream side in the conveyance direction.

The surface of the sheet feed roller 12 is covered with an elastic member such as rubber, and a large number of minute projections are formed on the surface of the elastic member. Therefore, when the sheet feed roller 12 sends the print medium 9 to the conveyance path 14 on the downstream side, a constant frictional force is generated between the sheet feed roller 12 and the print medium 9, and the print medium 9 can be appropriately conveyed to the downstream side by the frictional force.

On the other hand, when a predetermined amount or more of paper dust adheres to the surface of the sheet feed roller 12, an appropriate frictional force cannot be generated between the sheet feed roller 12 and the print medium 9, the sheet feed roller slides during the rotation of the sheet feed roller 12, and sheet misfeeding is likely to occur. In addition, also in a case where the number of the projections formed on the surface of the sheet feed roller 12 is reduced due to wear, an appropriate frictional force cannot be obtained, and sheet misfeeding is likely to occur.

In a case where a predetermined amount or more of paper dust adheres to the sheet feed roller 12, the surface state of the sheet feed roller 12 can be returned to the original state by cleaning the sheet feed roller 12. On the other hand, in a case where the number of the projections on the surface of the sheet feed roller 12 is reduced due to wear, the state does not return to the original state even if the sheet feed roller 12 is cleaned. Therefore, it is the replacement time of the sheet feed roller 12. Therefore, the image forming apparatus 1 of the present embodiment is configured to detect the surface state of the sheet feed roller 12 by measuring the fluctuation range of a load applied to the motor 31, which is the drive source of the sheet feed roller 12, and appropriately determine the cleaning time or the replacement time of the sheet feed roller 12. Hereinafter, the image forming apparatus 1 that makes such a determination will be described in detail.

(Control Mechanism of Image Forming Apparatus)

Figure 3:
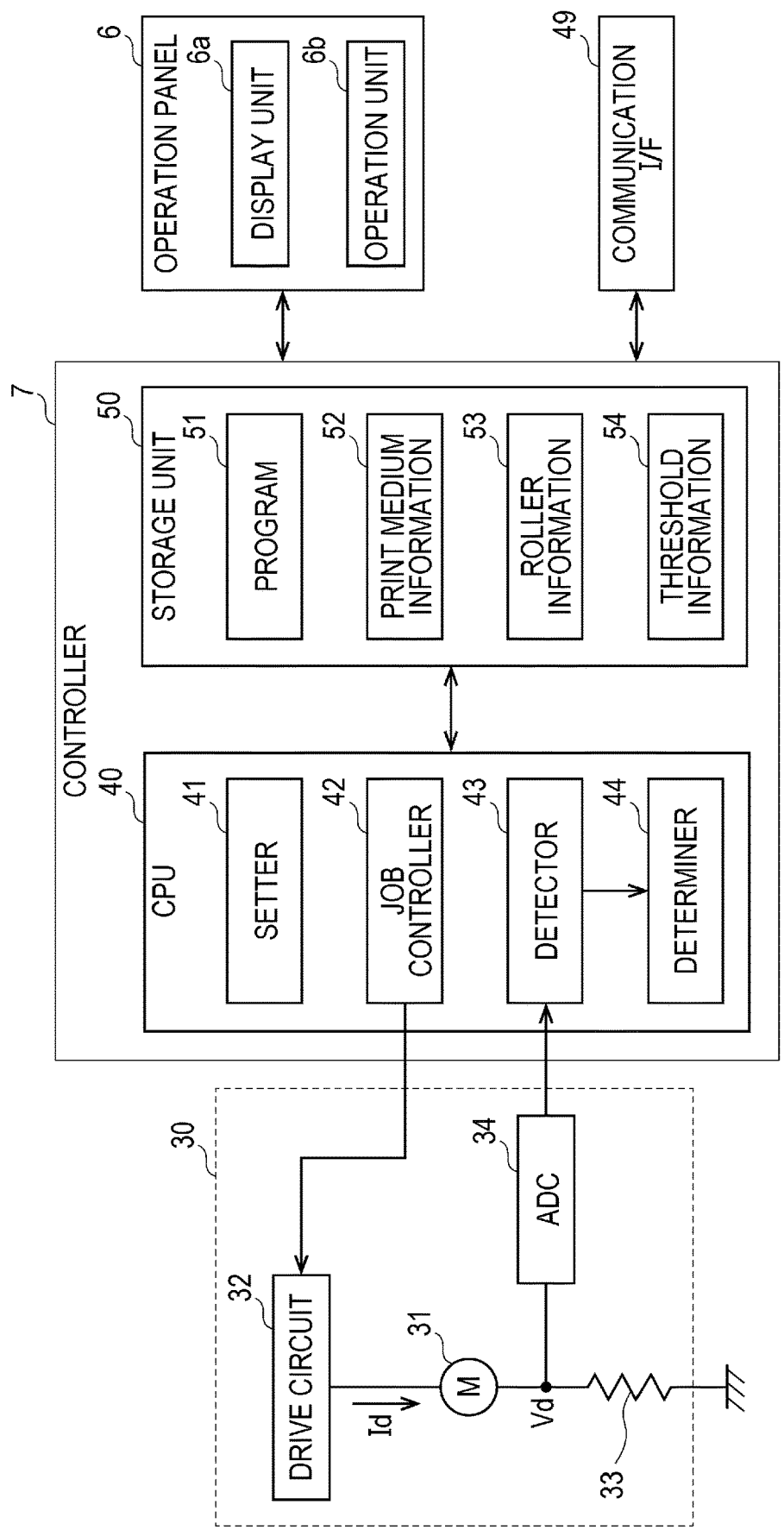
FIG. 3 is a block diagram illustrating a control mechanism of the image forming apparatus.

FIG. 3 is a block diagram illustrating a control mechanism of the image forming apparatus 1. The controller 7 of the image forming apparatus 1 includes a CPU 40 and a storage unit 50. The CPU 40 is a hardware processor that reads and executes a program 51 stored in advance in the storage unit 50. The storage unit 50 is a storage device that stores the program 51 executed by the CPU 40 and various types of information, and includes, for example, a semiconductor memory, a magnetic storage disk, or the like.

The operation panel 6 is connected to the controller 7. The operation panel 6 includes a display unit 6a and an operation unit 6b. The controller 7 can display various operation screens that can be operated by the user on the display unit 6a, a screen for notifying the user of the state of the image forming apparatus 1, and the like. In addition, the controller 7 receives an operation from the user via the operation unit 6b.

Furthermore, a communication interface 49 is connected to the controller 7. The communication interface 49 is used to connect the image forming apparatus 1 to a network such as a local area network (LAN) and communicate with an external device. The controller 7 can receive a print job from an external device via the communication interface 49. The controller 7 can also communicate with an external server or the like via the communication interface 49 to notify the outside of the state of the image forming apparatus 1.

As illustrated in FIG. 3, the CPU 40 of the controller 7 functions as a setter 41, a job controller 42, a detector 43, and a determiner 44 by reading and executing the program 51 stored in the storage unit 50. In addition to the program 51, the storage unit 50 stores print medium information 52, roller information 53, and threshold information 54. Each of the print medium information 52, the roller information 53, and the threshold information 54 is information to be referred to for detecting the surface state of the sheet feed roller 12.

The setter 41 initializes each of the print medium information 52, the roller information 53, and the threshold information 54. By appropriately initializing these pieces of information, the setter 41 can accurately detect the surface state of the sheet feed roller 12 later, and can appropriately determine the cleaning time and the replacement time of the sheet feed roller 12.

For example, in a case where the print media 9 are stored in the sheet feed trays 10a, 10b, and 10c, the setter 41 displays a setting screen of the print medium 9 on the display unit 6a of the operation panel 6, and records information related to the print medium 9 in the print medium information 52 on the basis of the setting operation by the user. FIG. 4 is a diagram illustrating an example of the print medium information 52. As illustrated in FIG. 4, the print medium information 52 is information in which the type and size of the print medium 9 stored in each of the sheet feed trays 10a, 10b, and 10c are set. For example, the amount of paper dust adhering to the sheet feed roller 12 during conveyance of the print medium 9 varies depending on the type and size of the print medium 9. Specifically, in the type of the print medium 9, the recycled paper has the largest amount of paper dust, and the amount of paper dust decreases in the order of plain paper and coated paper. Furthermore, in a case where the size of the print medium 9 is large, the time during which the sheet feed roller 12 comes into contact with the print medium 9 is long, and thus the amount of paper dust increases as the size increases. Therefore, when the print media 9 are stored in the sheet feed trays 10a, 10b, and 10c, by setting the information related to the print medium 9 in the print medium information 52, the setter 41 can determine the amount of paper dust adhering to the surface of the sheet feed roller 12 on the basis of the type and size of the print medium 9.

In addition, the setter 41 updates the roller information 53 in a case where the sheet feed roller 12 is replaced with a new one. FIG. 5 is a diagram illustrating an example of the roller information 53. The roller information 53 is information in which a travel distance from previous cleaning, a total travel distance, and a replacement-specified travel distance are recorded as information related to the sheet feed roller 12 provided in each of the sheet feed trays 10a, 10b, and 10c. The travel distance from the previous cleaning is information indicating a distance that the sheet feed roller 12 has been rotationally driven and traveled after the previous cleaning of the sheet feed roller 12. The total travel distance is information indicating the distance that a new sheet feed roller 12 has travels so far. The replacement-specified travel distance is information specifying a travel distance at which the new sheet feed roller 12 comes to the end of its life. When the sheet feed roller 12 provided in any one of the plurality of sheet feed trays 10a, 10b, and 10c is replaced with a new one, the setter 41 resets the travel distance from the previous cleaning and the total travel distance of the sheet feed roller 12 in the sheet feed tray to "0", records the travel distance corresponding to the life of the replaced new sheet feed roller 12 as the replacement-specified travel distance, thereby updating the roller information 53. For example, the life of the sheet feed roller 12 varies depending on the material of the elastic member, the shape of the projection on the surface, and the like. Therefore, the setter 41 may automatically read identification information such as the serial number of the sheet feed roller 12 set in each of the sheet feed trays 10a, 10b, and 10c and automatically record the replacement-specified travel distance based on the type of the sheet feed roller 12, or may record the replacement-specified travel distance on the basis of information input to the operation panel 6 by the user. Note that the travel distance from the previous cleaning is reset to "0" every time the cleaning operation of the sheet feed roller 12 is performed.

Furthermore, the setter 41 sets the threshold information 54. The threshold information 54 is information in which a threshold for determining whether or not the surface state of the sheet feed roller 12 is in a state requiring cleaning or whether or not the sheet feed roller 12 is in a state requiring replacement is recorded. FIG. 6 is a diagram illustrating an example of the threshold information 54. For example, in the threshold information 54, thresholds Vth1, Vth2, and Vth3 for determining the surface state of the sheet feed roller 12 are set for the sheet feed trays 10a, 10b, and 10c, respectively. In this manner, by setting the thresholds Vth1, Vth2, and Vth3 for the sheet feed trays 10a, 10b, and 10c, respectively, it is possible to refer to the different thresholds Vth1, Vth2, and Vth3 when determining the surface state of the sheet feed roller 12 provided in each of the sheet feed trays 10a, 10b, and 10c. However, it is not limited thereto, and the threshold information 54 may be information in which one threshold Vth common to the sheet feed trays 10a, 10b, and 10c is set. When the sheet feed roller 12 of each of the sheet feed trays 10a, 10b, and 10c is replaced with a new one, the setter 41 initializes the thresholds Vth1, Vth2, and Vth3 on the basis of the position of the sheet feed tray, the type and size of the print medium 9 stored in the sheet feed tray, the model of the image forming apparatus 1, the type of the sheet feed roller 12, and the like. Note that the position of the sheet feed tray and the model of the image forming apparatus 1 can be specified on the basis of information input to the operation panel 6 by the user.

The job controller 42 controls execution of a job in the image forming apparatus 1. When receiving a print job via the communication interface 49, the job controller 42 operates the sheet feeder 2 and the image forming unit 3. The job controller 42 feeds the print medium 9 one by one from the sheet feeder 2, secondarily transfers the toner image to the print medium 9 in the image forming unit 3, and fixes the toner image in the fixing unit 8, thereby discharging the print medium 9 having the image formed thereon onto the tray 19. In addition, even in a case where the execution of the print job is instructed via the operation panel 6, the job controller 42 controls an operation similar to that described above to discharge the print medium 9 having the image formed thereon onto the tray 19.

The job controller 42 operates a drive mechanism 30 that drives the sheet feed roller 12 when feeding the print medium 9 toward the conveyance path 14. The drive mechanism 30 includes the motor 31, a drive circuit 32, a current detection resistor 33, and an A/D converter (hereinafter, "ADC") 34. As illustrated in FIG. 3, the job controller 42 operates the drive circuit 32 and causes a drive current Id to flow from the drive circuit 32 to the motor 31 to drive the motor 31. As a result, the motor 31 rotationally drives the sheet feed roller 12 in a predetermined direction.

The job controller 42 updates the roller information 53 in the storage unit 50 every time the sheet feed roller 12 is driven for the sheet feed operation. That is, the job controller 42 updates the roller information 53 by adding the distance that the sheet feed roller 12 has traveled by the current drive to the values of the travel distance from the previous cleaning and the total travel distance of the sheet feed roller 12 in the tray to be driven. Note that the distance that the sheet feed roller 12 has traveled by the current drive can be calculated on the basis of the size of the print medium 9 fed this time and the number of fed sheets.

When the motor 31 drives the sheet feed roller 12, the drive current Id changes depending on the load applied to the motor 31. The current detection resistor 33 is a resistor that converts the drive current Id into a voltage and detects the load applied to the motor 31 as a voltage. The ADC 34 converts the load applied to the motor 31 converted into the voltage into a digital signal. The ADC 34 then outputs the load applied to the motor 31 converted into the digital signal to the CPU 40 of the controller 7.

The detector 43 detects the fluctuation range of the load applied to the motor 31 when the sheet feed roller 12 is rotationally driven. The detector 43 detects the fluctuation range of the load applied to the motor 31 on the basis of a signal output from the ADC 34. For example, when the motor 31 drives the sheet feed roller 12, the load applied to the motor 31 fluctuates with a cycle of about 5 ms. Therefore, by sampling a signal output from the ADC 34 with a cycle (for example, 1 ms) shorter than the fluctuation cycle of the load applied to the motor 31, the detector 43 can detect the fluctuation range of the load applied to the motor.

Figure 7A:
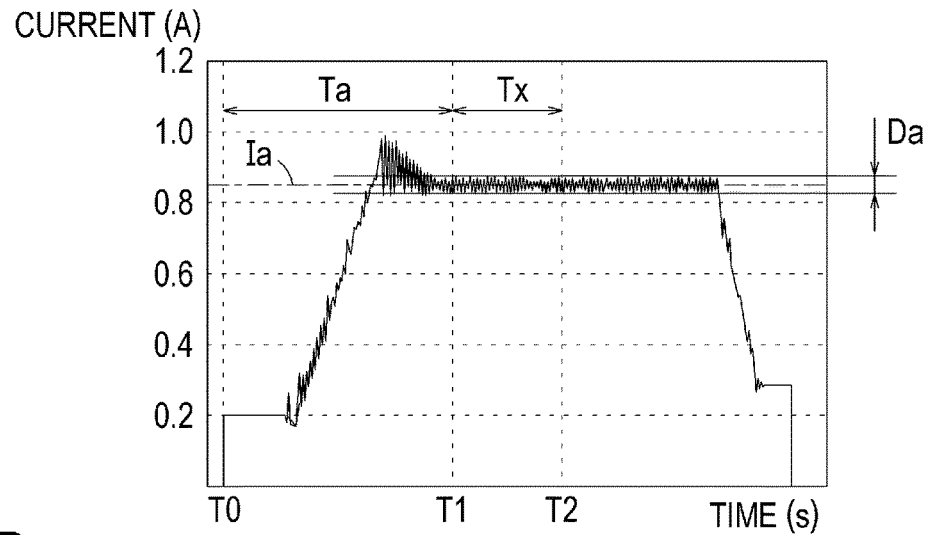
FIGS. 7A to 7C are diagrams illustrating temporal changes in a drive current when the sheet feed roller is rotationally driven.
Figure 7B:
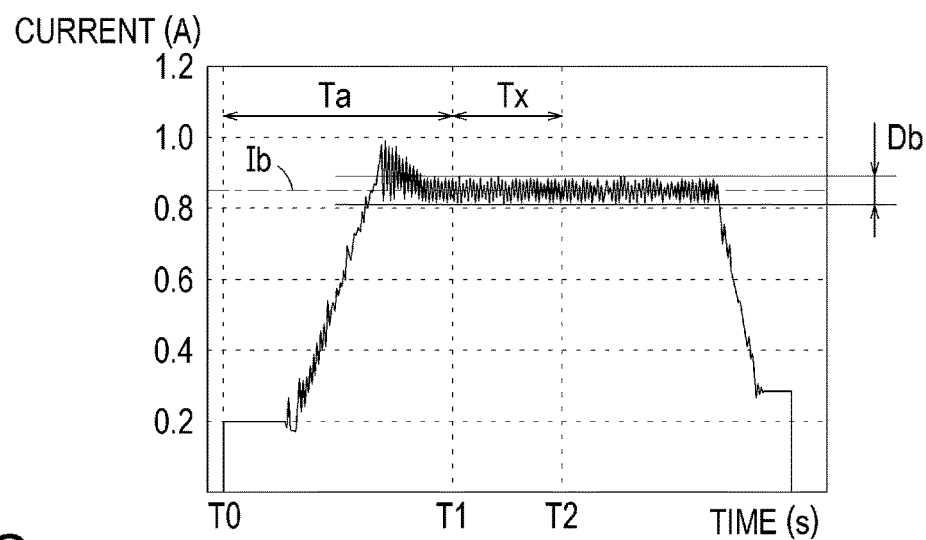
Figure 7C:
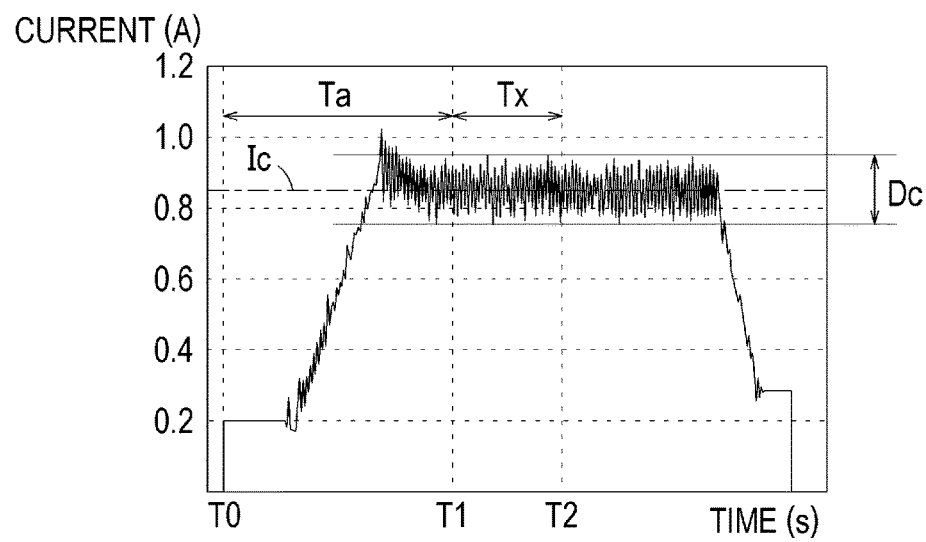

FIGS. 7A to 7C are diagrams illustrating temporal changes in the drive current Id when the sheet feed roller 12 is rotationally driven. FIG. 7A illustrates a change in the drive current Id in a state where the sheet feed roller 12 is new and no paper dust adheres to the surface. The supply of the drive current Id starts at a time T0, and the motor 31 starts to rotate. Thereafter, the drive current Id gradually increases, and the rotation speed of the motor 31 gradually increases accordingly. When a predetermined time Ta has elapsed from the start of driving of the motor 31, the rotation of the motor 31 is stabilized, and the rotation of the sheet feed roller 12 is also stabilized. Since a large number of minute projections are formed on the surface of the sheet feed roller 12, even in a case where the sheet feed roller 12 is new and no paper dust adheres to the surface, the sheet feed roller slightly slides when the sheet feed roller 12 rotates. The load applied to the motor 31 fluctuates with the sliding, and a current ripple appears in the drive current Id.

That is, the load applied to the motor 31 appears as the fluctuation range of the current ripple of the drive current Id. In addition, while the fluctuation range of the drive current Id varies relatively large in the start period from the start of driving of the motor 31 until the predetermined time Ta elapses, the rotation of the motor 31 is stabilized in the stable driving period after the predetermined time Ta has elapsed from the start of driving. Therefore, the fluctuation range of the drive current Id varies relatively small, and the fluctuation range is also stabilized.

For example, as illustrated in FIG. 7A, in a case where the sheet feed roller 12 is new and no paper dust adheres to the surface, a fluctuation range Da of the drive current Id in the stable driving period is relatively small. In addition, as illustrated in FIG. 7A, in a state where the sheet feed roller 12 is new and no paper dust adheres to the surface, no sheet misfeeding of the sheet feed roller 12 occurs, and thus no jam occurs.

FIG. 7B illustrates a change in the drive current Id in a state where the sheet feed roller 12 is new and a small amount of paper dust adheres to the surface. In this case, when the motor 31 drives the sheet feed roller 12, the sliding of the sheet feed roller 12 in the stable driving period increases, so that the load applied to the motor 31 increases and a fluctuation range db of the drive current Id also increases. That is, the fluctuation range db of the drive current Id is larger than the fluctuation range Da in FIG. 7A. Here, since the amount of paper dust is small even in the state illustrated in FIG. 7B, the sheet misfeeding of the sheet feed roller 12 does not occur, and the jam does not occur.

FIG. 7C illustrates a change in the drive current Id in a state where the sheet feed roller 12 is new and a large amount of paper dust adheres to the surface. In this case, when the motor 31 drives the sheet feed roller 12, the sliding of the sheet feed roller 12 in the stable driving period increases, so that the load applied to the motor 31 further increases and a fluctuation range Dc of the drive current Id further increases. That is, the fluctuation range Dc of the drive current Id is larger than the fluctuation range db in FIG. 7B. Furthermore, since the amount of paper dust is large even in the state illustrated in FIG. 7C, the sheet misfeeding of the sheet feed roller 12 is likely to occur, and the frequency of occurrence of the jam increases.

When the sheet feed roller 12 is rotationally driven by the motor 31 during the execution of the print job, the detector 43 detects the fluctuation range of the drive current Id flowing through the motor 31, thereby detecting the state of the surface of the sheet feed roller 12. Here, the detector 43 does not perform processing of detecting the fluctuation range of the drive current Id in the period from the time T0 when driving of the motor 31 starts until the predetermined time Ta elapses, and performs the processing of detecting the fluctuation range of the drive current Id in a detection period Tx from a time T1 to a time T2 after the predetermined time Ta has elapsed from the time T0 when driving of the motor 31 starts. As a result, it is possible to prevent erroneous detection of the fluctuation range in a state where the drive current Id is not stable.

Note that in FIGS. 7A to 7C, average values Ia, Ib, and Ic of the drive current Id in the detection period Tx are substantially equal to each other. Therefore, it is not possible to appropriately detect the load applied to the motor 31 only by calculating the average values Ia, Ib, and Ic of the drive current Id as in the conventional technique of JP 2000-238934 A.

Figure 8A:
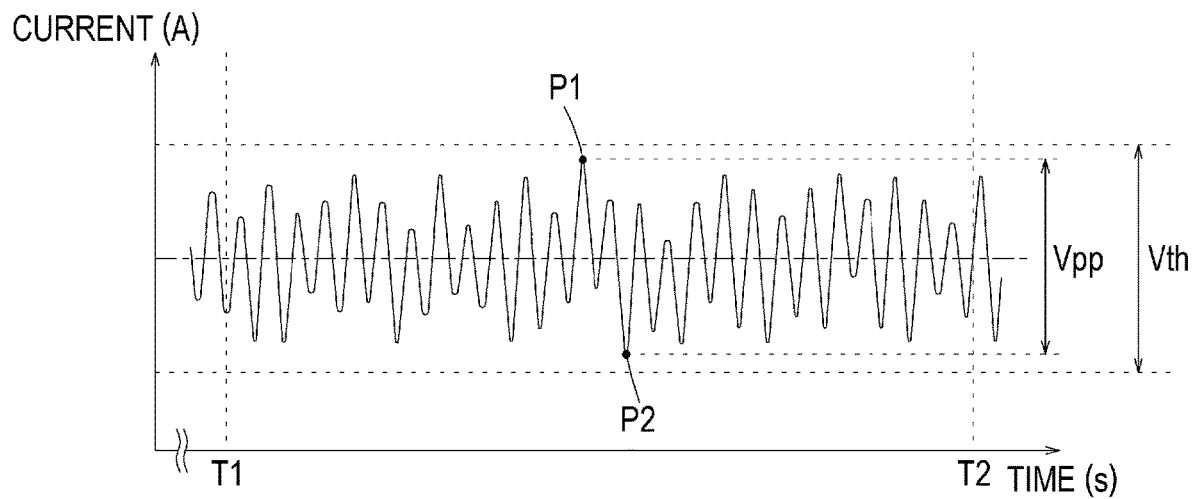
FIGS. 8A and 8B are enlarged views of fluctuations in the drive current in a detection period.
Figure 8B:
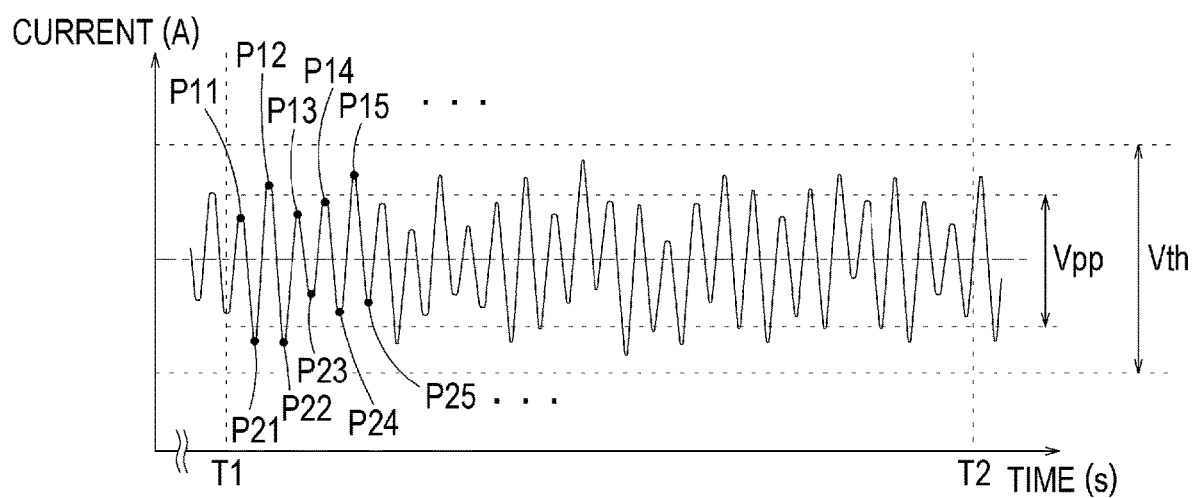

FIGS. 8A and 8B are enlarged views of fluctuations in the drive current Id in the detection period Tx. FIG. 8A is a diagram illustrating a first detection method by the detector 43. For example, as illustrated in FIG. 8A, since the drive current Id fluctuates up and down in the detection period Tx, the drive current includes a plurality of local maximum values and local minimum values. The detector 43 detects the plurality of local maximum values and local minimum values, detects a maximum value P1 from the plurality of local maximum values, and detects a minimum value P2 from the plurality of local minimum values. Then, by calculating the difference between the maximum value P1 and the minimum value P2, the detector 43 may obtain a fluctuation range Vpp of the drive current Id. Here, in the case of the first detection method, if the maximum value P1 or the minimum value P2 includes a noise component, there is a possibility that a value far away from other local maximum values or local minimum values may be detected, and the fluctuation range Vpp may not accurately represent the load applied to the motor 31.

FIG. 8B is a diagram illustrating a second detection method by the detector 43. In order to reduce the influence of the noise component, as illustrated in FIG. 8B, the detector 43 detects a plurality of local maximum values P11, P12, P13, P14, P15, . . . and a plurality of local minimum values P21, P22, P23, P24, P25, . . . that appear in the detection period Tx. Thereafter, the detector 43 calculates a local maximum average value obtained by averaging the plurality of local maximum values P11, P12, P13, P14, P15, . . . , and a local minimum average value obtained by averaging the plurality of local minimum values P21, P22, P23, P24, P25, . . . , to obtain the difference between the local maximum average value and the local minimum average value. Then, the detector 43 may detect the fluctuation range Vpp of the drive current Id from the difference between the local maximum average value and the local minimum average value. In this case, since the plurality of local maximum values and the plurality of local minimum values are individually averaged, the influence of the noise component can be smoothed, and the load applied to the motor 31 can be detected more accurately.

Furthermore, unlike the first and second detection methods, the detector 43 may detect the local maximum value and the local minimum value that sequentially appear in the detection period Tx, and detect every time the fluctuation range Vpp based on the difference between the local maximum value and the local minimum value. In this case, the detector 43 detects a plurality of fluctuation ranges Vpp in the detection period Tx.

When detecting the fluctuation range Vpp of the drive current Id, the detector 43 outputs the fluctuation range Vpp to the determiner 44.

Meanwhile, in a case where the sheet feed roller 12 is new, the fluctuation range Vpp of the drive current Id changes depending on only the amount of paper dust adhering to the surface of the sheet feed roller 12 as described above. On the other hand, when the sheet feed roller 12 comes close to the end of its life, the projections on the surface deteriorate due to wear. Therefore, even if paper dust does not adhere to the surface of the sheet feed roller 12, the sheet feed roller slides during the rotation of the sheet feed roller 12, and the fluctuation range Vpp of the drive current Id increases.

The determiner 44 determines the state of the sheet feed roller 12 on the basis of the detection result of the detector 43. Specifically, the determiner 44 determines whether the sheet feed roller 12 reaches the cleaning time or the replacement time on the basis of the fluctuation range Vpp of the drive current Id. At this time, the determiner 44 reads the threshold Vth corresponding to the sheet feed roller 12 driven by the motor 31 from the threshold information 54 in the storage unit 50. The determiner 44 then determines whether or not the fluctuation range Vpp of the drive current Id is equal to or larger than the threshold Vth, and if the fluctuation range Vpp is equal to or larger than the threshold Vth, the determiner determines that it is the cleaning time or the replacement time of the sheet feed roller 12.

Furthermore, in a case where a plurality of fluctuation ranges Vpp are detected in the detection period Tx by the detector 43, when it is detected that the number of fluctuation ranges Vpp equal to or larger than the threshold Vth among the plurality of fluctuation ranges Vpp is plural, the determiner 44 may determine that it is the cleaning time or the replacement time of the sheet feed roller 12.

Whether or not it is the replacement time of the sheet feed roller 12 can be determined based on whether or not the total travel distance of the sheet feed roller 12 is equal to or longer than the replacement-specified travel distance. Therefore, in a case where the fluctuation range Vpp of the drive current Id is equal to or larger than the threshold Vth, the determiner 44 reads the total travel distance and the replacement-specified travel distance of the sheet feed roller 12 driven by the motor 31 from the roller information 53 in the storage unit 50, and determines that it is the cleaning time of the sheet feed roller 12 if the total travel distance is less than the replacement-specified travel distance. On the other hand, in a case where the fluctuation range Vpp of the drive current Id is equal to or larger than the threshold Vth, the determiner 44 determines that it is the replacement time of the sheet feed roller 12 if the total travel distance exceeds the replacement-specified travel distance.

Figure 9A:
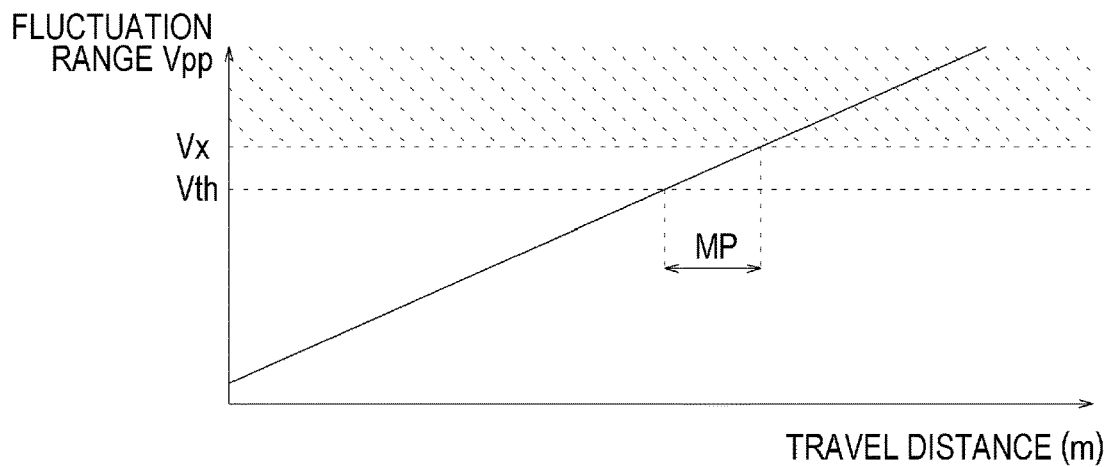
FIGS. 9A to 9C are diagrams illustrating a relationship between the travel distance of the sheet feed roller and the fluctuation range of the drive current.
Figure 9B:
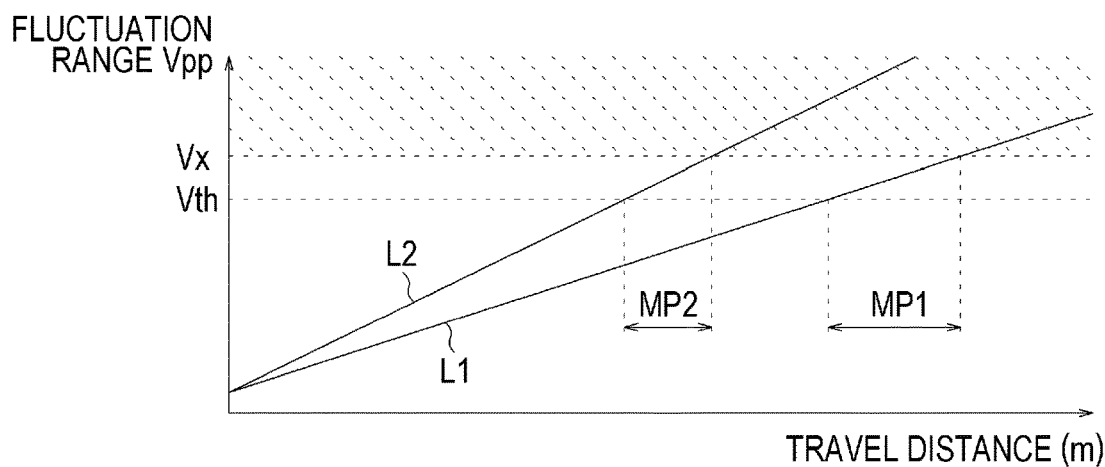
Figure 9C:
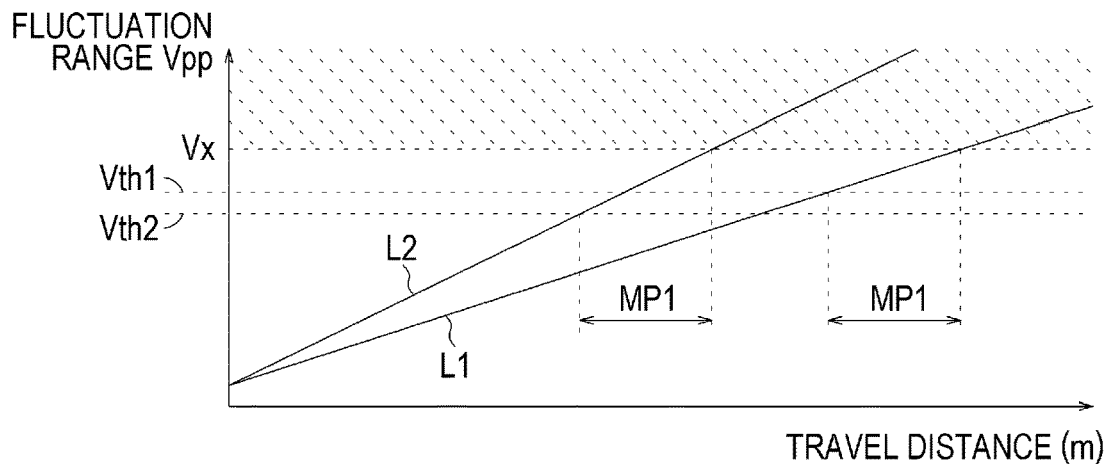

FIGS. 9A to 9C are diagrams illustrating the relationship between the travel distance of the sheet feed roller 12 and the fluctuation range Vpp of the drive current Id. Note that the shaded areas illustrated in FIGS. 9A to 9C represent areas where the frequency of occurrence of jams is large. For example, as illustrated in FIG. 9A, as the sheet feed roller 12 is repeatedly driven and thus the travel distance of the sheet feed roller 12 increases, the amount of paper dust adhering to the surface of the sheet feed roller 12 gradually increases, so that the fluctuation range Vpp of the drive current Id increases with the increase in the travel distance. Here, when the fluctuation range Vpp of the drive current Id is equal to or larger than a predetermined Vx, a jam is likely to occur. Therefore, the threshold Vth is initialized to a value smaller than the predetermined value Vx, and is set as a value with which the cleaning time or the replacement time can be detected before sheet misfeeding of the sheet feed roller 12 occurs. By setting the threshold Vth to a value smaller than the predetermined value Vx, a certain period MP can be secured until the fluctuation range Vpp of the drive current Id becomes equal to or larger than the predetermined value Vx. By performing the cleaning operation or the replacement operation of the sheet feed roller 12 in this period MP, it is possible to suppress frequent occurrence of jams in the image forming apparatus 1 and to prevent a decrease in productivity.

FIG. 9B illustrates the relationship between the travel distance and the fluctuation range Vpp in a case where different types of the print media 9 are fed by the sheet feed roller 12. For example, in a case where the sheet feed roller 12 repeatedly feeds plain paper, the fluctuation range Vpp of the drive current Id changes along a straight line L1. On the other hand, in a case where the sheet feed roller 12 repeatedly feeds recycled paper with a larger amount of generated paper dust than that of the plain paper, the fluctuation range Vpp of the drive current Id changes along a straight line L2. As described above, the inclination of the fluctuation range Vpp of the drive current Id changes depending on the type of the print medium 9. Here, when the same threshold Vth is used for the plain paper and the recycled paper, the period MP1 and the period MP2 that can be secured for the cleaning operation or the replacement operation are different periods. That is, while the relatively long period MP1 can be secured in the case of the plain paper with a small amount of generated paper dust, the period MP2 that can be secured in the case of the recycled paper with a large amount of generated paper dust is shorter than the period MP1.

Therefore, when the setter 41 sets the threshold Vth for determining the cleaning time or the replacement time of the sheet feed roller 12 provided in each of the sheet feed trays 10a, 10b, and 10c, it is preferable to set thresholds Vth1 and Vth2 based on the type of the print medium 9 stored in each of the sheet feed trays 10a, 10b, and 10c.

FIG. 9C illustrates the relationship between the drive current Id and the fluctuation range Vpp in a case where different thresholds Vth1 and Vth2 are set based on the type of the print medium 9. For example, as illustrated in FIG. 9C, the setter 41 sets the threshold Vth2 of the print medium 9 with a large amount of generated paper dust such as recycled paper to a value smaller than the threshold Vth1 of the print medium 9 with a small amount of generated paper dust such as plain paper. As a result, regardless of the type of the print medium 9, the period that can be secured for the cleaning operation or the replacement operation can be made uniform as the same period MP1 as illustrated in FIG. 9C. Therefore, it is possible to reliably perform the cleaning operation or the replacement operation of the sheet feed roller 12 in the uniformized period MP1. In this case, since the thresholds Vth1 and Vth2 change depending on the type of the print medium 9 conveyed by the sheet feed roller 12, the processing in which the determiner 44 determines the cleaning time or the replacement time of the sheet feed roller 12 on the basis of the fluctuation range Vpp is equivalent to making a determination based on the type of the print medium 9.

The inclination of the fluctuation range Vpp of the drive current Id changes depending on not only the type of the print medium 9 but also the size of the print medium 9, the position of the sheet feed tray, the internal structure of the image forming apparatus 1, the type of the sheet feed roller 12, and the like. Therefore, as described above, by initializing the thresholds Vth1, Vth2, and Vth3 on the basis of the position of the sheet feed tray, the type and size of the print medium 9 stored in the sheet feed tray, the model of the image forming apparatus 1, the type of the sheet feed roller 12, and the like, the setter 41 can secure the certain period MP1 as a period for performing the cleaning operation or the replacement operation of the sheet feed roller 12. Note that the inclination of the fluctuation range Vpp of the drive current Id may be different depending on each image forming apparatus even if the image forming apparatuses 1 are of the same model. In such a case, it is preferable to individually set a threshold based on each image forming apparatus 1.

Figure 10:
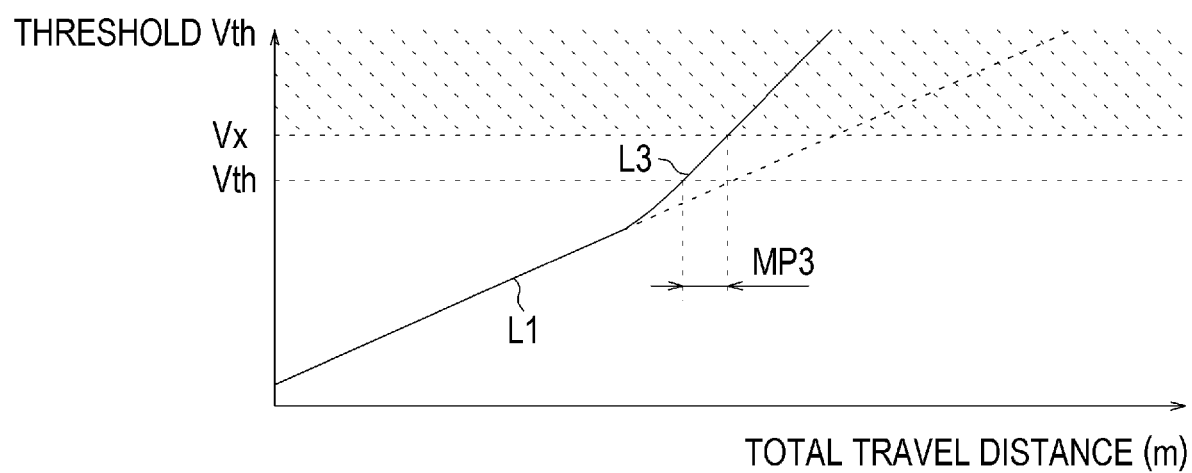
FIG. 10 is a diagram illustrating an example in which the inclination of the fluctuation range changes.

In addition, even if the threshold Vth is initialized by the setter 41 as described above, when the total travel distance of the sheet feed roller 12 increases, the wear deterioration of the projections on the surface progresses, and thus, the inclination of the fluctuation range Vpp of the drive current Id of the sheet feed roller 12 may change depending on the wear deterioration. FIG. 10 is a diagram illustrating an example in which the inclination of the fluctuation range Vpp changes. In the example illustrated in FIG. 10, when the wear deterioration of the projections on the surface of the sheet feed roller 12 does not progress so much, the fluctuation range Vpp of the drive current Id changes along the straight line L1 as the travel distance increase. However, when the total travel distance of the sheet feed roller 12 increases and the wear deterioration of the projections progresses, the inclination of the fluctuation range Vpp changes to a sharp inclination, and the fluctuation range Vpp of the drive current Id changes along a straight line L3. That is, even in a case where the sheet feed roller 12 continues to feed the same type of print medium 9, the inclination of the fluctuation range Vpp of the drive current Id changes due to the wear deterioration of the sheet feed roller 12. In a case where the inclination of the fluctuation range Vpp changes in this manner, it is not possible to determine an appropriate cleaning time or replacement time only by the initialization of the threshold Vth by the setter 41.

Therefore, it is preferable that the determiner 44 calculates the inclination of the fluctuation range Vpp on the basis of the fluctuation range Vpp at the time of sheet feeding in the past (for example, the previous time) by the sheet feed roller 12 and the fluctuation range Vpp at the time of sheet feeding this time, and determines the cleaning time or the replacement time of the sheet feed roller 12 on the basis of the changed inclination in a case where the inclination of the fluctuation range Vpp has changed. For example, the determiner 44 preferably changes the threshold Vth initialized by the setter 41 to a small value based on the total travel distance of the sheet feed roller 12, and determines the cleaning time or the replacement time of the sheet feed roller 12 using the changed value. As a result, even in a case where the inclination of the fluctuation range Vpp changes, the cleaning time or the replacement time of the sheet feed roller 12 can be appropriately determined.

When the determiner 44 determines that it is the cleaning time of the sheet feed roller 12, the cleaning guide screen indicating that it is the cleaning time of the sheet feed roller 12 is displayed on the display unit 6a of the operation panel 6. The cleaning guide screen includes, for example, a message indicating that a cleaning service by a service engineer should be obtained by contacting the service engineer. In addition, in a case where the determiner 44 determines that it is the cleaning time of the sheet feed roller 12, the determiner may access an external management server via the communication interface 49 and make an automated reservation for the cleaning service by the service engineer.

Furthermore, when the determiner 44 determines that it is the replacement time of the sheet feed roller 12, the replacement guide screen indicating that it is the replacement time of the sheet feed roller 12 is displayed on the display unit 6a of the operation panel 6. The replacement guide screen includes, for example, a message indicating that a replacement service by a service engineer should be obtained by contacting the service engineer. In addition, in a case where the determiner 44 determines that it is the replacement time of the sheet feed roller 12, the determiner may access an external management server via the communication interface 49 and make an automated reservation for the replacement service by the service engineer.

Further, in a case where a trouble occurs in the image forming apparatus 1 during driving of the sheet feed roller 12, the determiner 44 does not make a determination based on the detection result of the detector 43. This is because the sheet feed roller 12 is forcibly stopped in a case where a trouble such as a jam occurs in the image forming apparatus 1, and thus, the fluctuation range Vpp of the drive current Id detected by the detector 43 may indicate an abnormal value, and it is not preferable to determine the state of the sheet feed roller 12 on the basis of such an abnormal value.

(Operation of Image Forming Apparatus)

Figure 11:
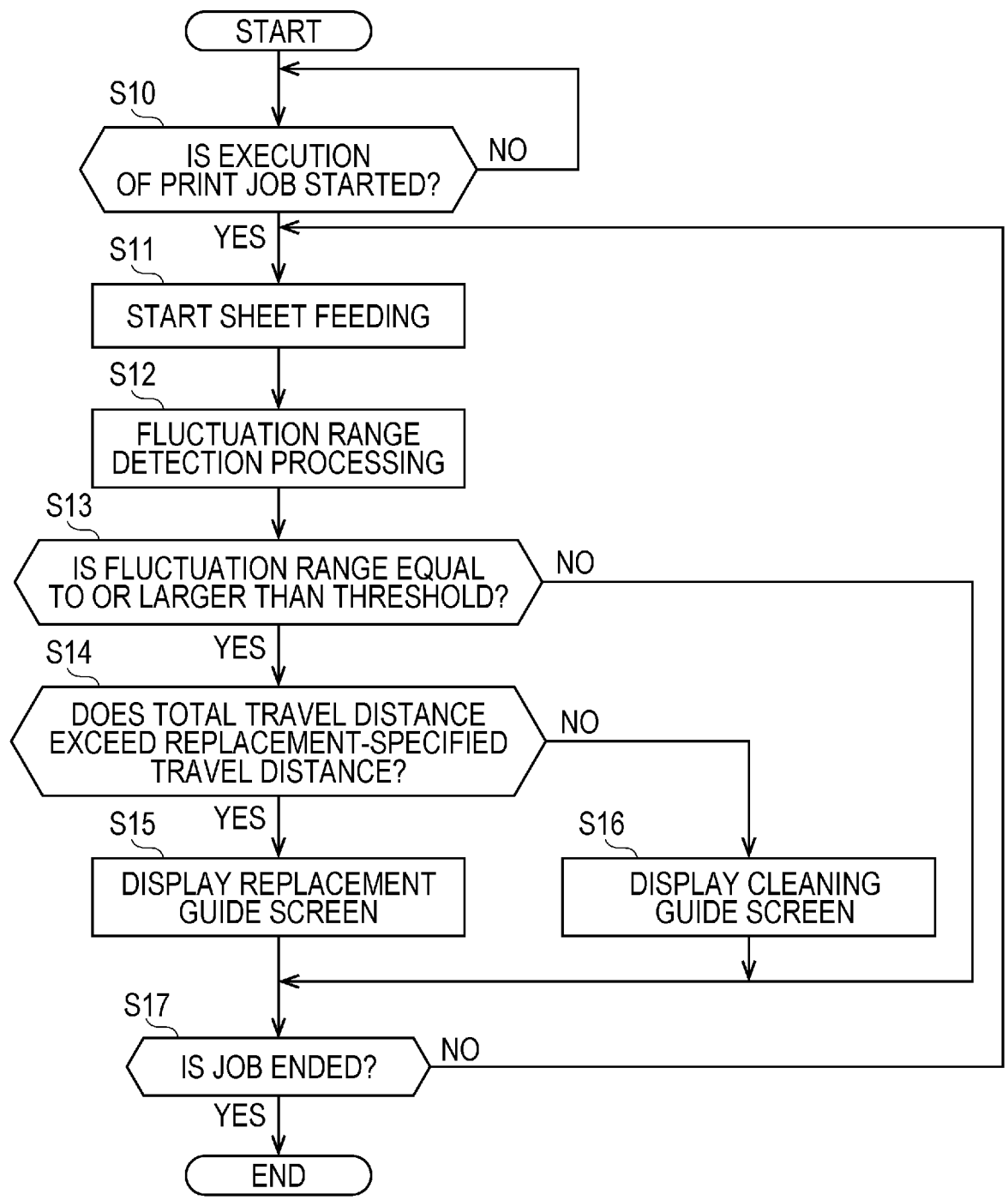
FIG. 11 is a flowchart illustrating an example of a processing procedure performed in the image forming apparatus.

Next, the operation of the image forming apparatus 1 will be described. FIG. 11 is a flowchart illustrating an example of a processing procedure performed in the image forming apparatus 1. This processing is performed by the CPU 40 of the controller 7 executing the program 51. When the processing starts, the image forming apparatus 1 determines whether or not to start the execution of a print job (step S10). If it is determined that the execution of the print job is started (YES in step S10), the image forming apparatus 1 causes the job controller 42 in the controller 7 to function. Then, the job controller 42 starts an operation of feeding the print medium 9 from the sheet feed tray designated by a user (step S11). As a result, the motor 31 is driven, and the sheet feed roller 12 starts a sheet feed operation.

When the sheet feed operation of the sheet feed roller 12 is started, the image forming apparatus 1 causes the detector 43 in the controller 7 to function. Then, the detector 43 performs fluctuation range detection processing of detecting the fluctuation range Vpp of the drive current Id flowing through the motor 31 (step S12). As a result, the load applied to the motor 31 is detected as the fluctuation range Vpp. When the fluctuation range Vpp of the drive current Id is detected, the image forming apparatus 1 causes the determiner 44 in the controller 7 to function. Then, the determiner 44 determines whether or not the fluctuation range Vpp detected by the detector 43 is equal to or larger than the threshold Vth (step S13). At this time, the determiner 44 may read the threshold Vth corresponding to the sheet feed tray on which the sheet feed operation is performed by the sheet feed roller 12 from the threshold information 54, and make a determination using the threshold Vth. Alternatively, the determiner 44 may change the threshold Vth read from the threshold information 54 based on the total travel distance of the sheet feed roller 12, and make a determination using the changed threshold Vth.

If the fluctuation range Vpp is equal to or larger than the threshold Vth (YES in step S13), the determiner 44 further determines whether or not the total travel distance of the sheet feed roller 12 exceeds the replacement-specified travel distance (step S14). As a result, if the total travel distance exceeds the replacement-specified travel distance (YES in step S14), the determiner 44 displays a replacement guide screen on the operation panel 6 (step S15). On the other hand, if the total travel distance does not exceed the replacement-specified travel distance (NO in step S14), the determiner 44 displays a cleaning guide screen on the operation panel 6 (step S16). Since each of the replacement guide screen and the cleaning guide screen is displayed at the timing when it is detected that the fluctuation range Vpp is equal to or larger than the threshold Vth, the replacement guide screen and the cleaning guide screen are displayed on the operation panel 6 even in a case where the execution of the print job is continued. Thereafter, the image forming apparatus 1 determines whether or not the execution of the print job has been completed (step S17), and if the execution of the print job has not been completed (NO in step S17), the process returns to step S11 and the processing described above is repeated.

Therefore, in a case where the sheet feed roller 12 continuously feeds a plurality of print media 9 during the execution of the print job, the image forming apparatus 1 determines whether or not the sheet feed roller 12 reaches the cleaning time or the replacement time each time the sheet feed operation is performed by the sheet feed roller 12. Then, when the image forming apparatus 1 determines that it is the cleaning time or the replacement time of the sheet feed roller 12 during the execution of the print job, the image forming apparatus 1 displays the cleaning guide screen or the replacement guide screen on the operation panel 6 at that timing. At the timing when the cleaning guide screen or the replacement guide screen is displayed, the surface state of the sheet feed roller 12 has not reached the state where sheet misfeeding occurs. Therefore, even in a state where the cleaning guide screen or the replacement guide screen is displayed, the image forming apparatus 1 can continuously execute the print job. As a result, it is not necessary to stop the execution of the print job, and the productivity of the image forming apparatus 1 does not decrease.

Next, FIG. 12 is a flowchart illustrating an example of another processing procedure performed in the image forming apparatus 1. Similarly to the above, this processing is performed by the CPU 40 of the controller 7 executing the program 51. The processing of the flowchart illustrated in FIG. 12 is different from the flowchart illustrated in FIG. 11 in step S20. Therefore, step S20 will be described in detail here.

If the fluctuation range Vpp detected by the detector 43 is equal to or larger than the threshold Vth (YES in step S13), the determiner 44 further determines whether or not the total travel distance of the sheet feed roller 12 exceeds the replacement-specified travel distance (step S14). As a result, if the total travel distance exceeds the replacement-specified travel distance (YES in step S14), the determiner 44 reads the roller information 53 and determines whether or not the travel distance from the previous cleaning is equal to or longer than a predetermined distance (step S21). Here, as the predetermined distance, for example, an average value of distances that the sheet feed roller travels from the previous cleaning to the next cleaning timing is set in advance. If the travel distance from the previous cleaning is equal to or longer than the predetermined distance even though the total travel distance of the sheet feed roller 12 exceeds the replacement-specified travel distance, it can be said that the wear deterioration of the sheet feed roller 12 has not progressed so much. Therefore, the surface state of the sheet feed roller 12 can be returned to the reusable state only by performing the cleaning operation. Therefore, if the travel distance from the previous cleaning is equal to or longer than the predetermined distance (YES in step S21), the determiner 44 displays the cleaning guide screen on the operation panel 6 (step S22). As a result, the sheet feed roller 12 is cleaned, and the sheet feed roller 12 with an exceeded replacement-specified travel distance can be used for a long period of time.

If the travel distance from the previous cleaning is less than the predetermined distance (NO in step S21), the determiner 44 displays the replacement guide screen on the operation panel 6 (step S23). That is, if the total travel distance exceeds the replacement-specified travel distance and the travel distance from the previous cleaning is less than the predetermined distance, it can be predicted that the frequency of cleaning will increase in the future. Therefore, in order to prevent an increase in the frequency of cleaning, the determiner 44 predicts that the replacement time will come in the near future, and guides the replacement of the sheet feed roller 12 with a new one.

On the other hand, if the total travel distance does not exceed the replacement-specified travel distance (NO in step S14), the determiner 44 determines whether or not the travel distance from the previous cleaning is less than the predetermined distance (step S24). Even in a case where the total travel distance of the sheet feed roller 12 does not exceed the replacement-specified travel distance, if the travel distance from the previous cleaning is less than the predetermined distance, it can be said that the wear deterioration of the sheet feed roller 12 has progressed more than expected. Therefore, it can be predicted that the frequency of cleaning will increase in the future. Therefore, in order to prevent an increase in the frequency of cleaning, the determiner 44 predicts that the replacement time has advanced, and displays the replacement guide screen on the operation panel 6 (step S25).

If the travel distance from the previous cleaning is equal to or longer than the predetermined distance (NO in step S24), the determiner 44 displays the cleaning guide screen on the operation panel 6 (step S26). That is, if the total travel distance does not exceed the replacement-specified travel distance and the travel distance from the previous cleaning is equal to or longer than the predetermined distance, the surface state of the sheet feed roller 12 can be returned to the reusable state only by performing the cleaning operation. Therefore, if the travel distance from the previous cleaning is equal to or longer than the predetermined distance (NO in step S24), the determiner 44 displays the cleaning guide screen on the operation panel 6 (step S26). As a result, the sheet feed roller 12 is cleaned, and the sheet feed roller 12 can be normally used until the total travel distance of the sheet feed roller exceeds the replacement-specified travel distance.

In this manner, when determining the replacement time of the sheet feed roller 12, the determiner 44 is only required to predict an appropriate replacement time on the basis of the travel distance from the previous cleaning, and output an instruction to replace the sheet feed roller 12 before the predicted replacement time comes.

As described above, the image forming apparatus 1 of the present embodiment includes the motor 31 that drives the sheet feed roller 12, the detector 43 that detects the fluctuation range of the load applied to the motor 31 by driving the sheet feed roller 12, and the determiner 44 that determines the state of the sheet feed roller 12 on the basis of the detection result of the detector 43. When the motor 31 drives the sheet feed roller 12, the load applied to the motor 31 fluctuates depending on the state of the sheet feed roller 12. Therefore, by using the configuration of detecting the fluctuation range, the state of the sheet feed roller 12 driven by the motor 31 can be appropriately detected. As a result, it is possible to appropriately determine the cleaning time or the replacement time of the sheet feed roller 12, and thus, it is possible to perform the cleaning operation or the replacement operation at an appropriate timing based on the state of the sheet feed roller 12. Therefore, the frequency of cleaning or replacement can be minimized, so that the productivity of the image forming apparatus 1 can be improved.

Furthermore, in the image forming apparatus 1 of the present embodiment, the sheet feed roller 12 is provided in each of the plurality of sheet feed trays 10a, 10b, and 10c. The detector 43 detects the fluctuation range Vpp for each of the sheet feed rollers 12 provided in the plurality of sheet feed trays 10a, 10b, and 10c, and the determiner 44 individually determines the cleaning time or the replacement time of each of the sheet feed rollers 12 provided in the plurality of sheet feed trays 10a, 10b, and 10c. Therefore, it is possible to make an appropriate determination based on each of the plurality of sheet feed rollers 12.

Modifications

Several preferred embodiments of the present invention have been described above. However, the present invention is not limited to the contents described in the above embodiments, and various modifications can be applied.

For example, in the above embodiment, an example has been described in which the load applied to the motor 31 is detected by detecting the fluctuation range of the drive current Id flowing through the motor 31. However, the motor 31 is not limited to one that is driven by the drive current Id. For example, the drive circuit 32 may drive the motor 31 by outputting a PWM signal. In this case, the fluctuation range of the load applied to the motor 31 appears in the fluctuation range of the pulse width (the duty ratio) of the PWM signal. Therefore, the detector 43 may detect the load applied to the motor 31 by detecting the fluctuation range of the pulse width of the PWM signal.

Furthermore, in the above embodiment, an example has been described in which the detector 43 detects the fluctuation range of the load applied to the motor 31, and the determiner 44 determines the state of the sheet feed roller 12 on the basis of the fluctuation range. However, it is not limited thereto. For example, the detector 43 may detect the average value of the load applied to the motor 31 in addition to the fluctuation range of the load applied to the motor 31, and the determiner 44 may determine the state of the sheet feed roller 12 on the basis of the fluctuation range and the average value of the load applied to the motor 31. By using both the fluctuation range and the average value of the load applied to the motor 31, it is possible to improve the accuracy in detecting the state of the sheet feed roller 12.

Furthermore, in the above embodiment, the case where the determiner 44 uses one threshold Vth when determining the cleaning time or the replacement time of the sheet feed roller 12 has been exemplified. However, it is not limited thereto, and the determiner 44 may make a determination using different thresholds for determining the cleaning time and for determining the replacement time. In this case, the threshold for determining the cleaning time is slightly smaller than the threshold for determining the replacement time.

Moreover, in the above embodiment, the case where the object driven by the motor 31 is the sheet feed roller 12 has been exemplified, but the object to which the present invention can be applied is not limited to the sheet feed roller 12. For example, the present invention can be widely applied to rollers for conveying the print medium 9. Furthermore, the object to which the present invention can be applied is not limited to the roller, and may be a rotating body such as the photosensitive drum 24.

In the above embodiment, the case where the drive source includes the motor 31 has been exemplified. However, the drive source is not necessarily limited to the motor 31.

Although embodiments of the present invention have been described and illustrated in detail, the disclosed embodiments are made for purposes of illustration and example only and not limitation. The scope of the present invention should be interpreted by terms of the appended claims.

What is claimed is:
1. An image forming apparatus comprising:
a drive source that drives a roller that conveys a print medium; and
a hardware processor that detects a fluctuation range of a load applied to the drive source by driving the roller, and determines a state of a surface of the roller on a basis of a detection result.

2. The image forming apparatus according to claim 1, wherein
the drive source rotationally drives the roller.

3. The image forming apparatus according to claim 2, wherein the print medium is a sheet-like medium.

4. An image forming apparatus comprising:
a drive source that rotationally drives a roller that conveys a print medium that is a sheet-like medium; and
a hardware processor that detects a fluctuation range of a load applied to the drive source by driving the roller, and determines a cleaning time or a replacement time of the roller on a basis of a detection result.

5. The image forming apparatus according to claim 4, wherein the hardware processor further determines a cleaning time or a replacement time of the roller on a basis of a travel distance of the roller.

6. The image forming apparatus according to claim 5, wherein the hardware processor further determines a cleaning time or a replacement time of the roller on a basis of a type of the print medium conveyed by the roller.

7. The image forming apparatus according to claim 5, wherein the hardware processor further determines a cleaning time or a replacement time of the roller on a basis of a size of the print medium conveyed by the roller.

8. The image forming apparatus according to claim 4, wherein the hardware processor determines that it is a cleaning time or a replacement time of the roller in a case where a fluctuation range of a load applied to the drive source is equal to or larger than a predetermined threshold.

9. The image forming apparatus according to claim 4, wherein the hardware processor determines that it is a cleaning time or a replacement time of the roller in a case where it is detected a plurality of times that a fluctuation range of a load applied to the drive source is equal to or larger than a predetermined threshold.

10. The image forming apparatus according to claim 8, wherein the hardware processor changes the threshold based on a travel distance of the roller.

11. The image forming apparatus according to claim 8, wherein the hardware processor initializes a threshold corresponding to a model of the image forming apparatus as the threshold.

12. The image forming apparatus according to claim 1, wherein
the drive source includes a motor that rotates the roller, and
the hardware processor detects a fluctuation range of a load applied to the drive source by a fluctuation range of a current flowing through the motor.

13. The image forming apparatus according to claim 1, wherein
the drive source includes a motor that rotates the roller and is driven by a PWM signal, and
the hardware processor detects a fluctuation range of a load applied to the drive source by a fluctuation range of a pulse width of the PWM signal.

14. The image forming apparatus according to claim 4, wherein the hardware processor predicts a replacement time of the roller, and outputs an instruction to replace the roller before the replacement time of the roller comes.

15. The image forming apparatus according to claim 1, wherein
the roller is provided at a plurality of locations in an apparatus body,
the hardware processor detects the fluctuation range for the roller provided at each of the plurality of locations, and
the hardware processor determines a cleaning time or a replacement time of the roller provided at each of the plurality of locations on a basis of a detection result.

16. The image forming apparatus according to claim 1, wherein the hardware processor does not make a determination based on a detection result in a case where a trouble occurs in the image forming apparatus when the drive source drives the roller.

17. The image forming apparatus according to claim 5, wherein when the hardware processor determines that it is a cleaning time of the roller on a basis of a detection result, if a travel distance of the roller from a determination of previous cleaning time is less than a predetermined distance, the hardware processor determines that it is a replacement time of the roller even if a total travel distance of the roller is equal to or less than a replacement-specified travel distance.

18. The image forming apparatus according to claim 5, wherein when the hardware processor determines that it is a cleaning time of the roller on a basis of a detection result, if a travel distance of the roller from a determination of previous cleaning time is equal to or longer than a predetermined distance, the hardware processor determines that it is the cleaning time of the roller even if a total travel distance of the roller exceeds a replacement-specified travel distance.

19. The image forming apparatus according to claim 1, wherein
the hardware processor starts an operation of detecting a fluctuation range of a load applied to the drive source after a predetermined time has elapsed from start of rotation of the roller by the drive source.

20. The image forming apparatus according to claim 12, wherein the hardware processor calculates a local maximum average value obtained by averaging local maximum values of a current flowing through the motor and a local minimum average value obtained by averaging local minimum values, obtains a difference between the local maximum average value and the minimum local average value, and detects a fluctuation range of a load applied to the drive source.

21. The image forming apparatus according to claim 1, wherein
the hardware processor further detects an average value of a load applied to the drive source, and
the hardware processor determines a state of the surface of the roller on a basis of a fluctuation range and the average value of the load applied to the drive source.

22. An image forming apparatus comprising:
a motor that rotationally drives a roller that conveys a print medium that is a sheet-like medium; and
a hardware processor that
detects a fluctuation range of a load applied to the motor by driving the roller by a fluctuation range of a current flowing through the motor,
calculates an inclination of a change in the fluctuation range, and
determines a cleaning time or a replacement time of the roller on a basis of the inclination.

23. A detection method that detects a state of a surface of a roller in an image forming apparatus including a drive source that drives the roller that conveys a print medium, the detection method comprising:
detecting a fluctuation range of a load applied to the drive source by the drive source driving the roller; and
determining a state of the surface of the roller on a basis of a detection result of the detecting.

24. A non-transitory recording medium storing a computer readable program executed in an image forming apparatus including a drive source that drives a roller that conveys a print medium, the program causing the image forming apparatus to perform:
    detecting a fluctuation range of a load applied to the drive source by the drive source driving the roller; and
    determining a state of a surface of the roller on a basis of a detection result of the detecting.

\* \* \* \* \*